United States Patent [19]
Angevine

[11] 4,306,964
[45] Dec. 22, 1981

[54] MULTI-STAGE PROCESS FOR DEMETALATION AND DESULFURIZATION OF PETROLEUM OILS

[75] Inventor: Philip J. Angevine, West Deptford, N.J.

[73] Assignee: Mobil Oil Corporation, New York, N.Y.

[21] Appl. No.: 187,684

[22] Filed: Sep. 16, 1980

[51] Int. Cl.³ .................. C10G 45/00; C10G 45/04
[52] U.S. Cl. .............................. 208/210; 208/251 H
[58] Field of Search ...................... 208/210, 251 H

[56] References Cited

U.S. PATENT DOCUMENTS

| | | | |
|---|---|---|---|
| 3,696,027 | 10/1972 | Bridge | 208/210 |
| 3,977,962 | 8/1976 | Arey, Jr. et al. | 208/251 H |
| 4,016,067 | 4/1977 | Fischer et al. | 208/89 |
| 4,210,525 | 7/1980 | Peters | 208/251 H |

Primary Examiner—Delbert E. Gantz
Assistant Examiner—Olik Chaudhuri
Attorney, Agent, or Firm—Charles A. Huggett; Michael G. Gilman; Charles J. Speciale

[57] ABSTRACT

Hydrocarbon oils, preferably residual fractions, are catalytically hydroprocessed to remove metals, sulfur, and Conradson Carbon Residue by contacting the oil sequentially with three or more catalysts having sequentially decreasing average pore diameters and sequentially increasing surface areas.

3 Claims, No Drawings

MULTI-STAGE PROCESS FOR DEMETALATION AND DESULFURIZATION OF PETROLEUM OILS

BACKGROUND OF THE INVENTION

1. Field of the Invention

This invention is concerned with an improved catalytic process for the demetalation and desulfurization of petroleum oils, preferably those residual fractions with undesirably high metals and/or sulfur and/or Conradson Carbon Residue (CCR) contents. More particularly, this invention relates to a multi-stage hydrotreatment process for reducing high metals, sulfur and CCR contents of petroleum oils, again preferably those containing residual hydrocarbon components, by the use of a sequential combination of catalytic compositions which is especially effective for such a purpose.

2. Description of the Prior Art Residual petroleum oil fractions produced by atmospheric or vacuum distillation of crude petroleum are characterized by relatively high metals, sulfur and CCR content. This comes about because practically all of the metals and CCR present in the original crude remain in the residual fraction, and a disproportionate amount of sulfur in the original crude oil also remains in that fraction. Principal metal contaminants are nickel and vanadium, with iron and small amounts of copper also sometimes present. Additionally, trace amounts of zinc and sodium are found in some feedstocks. The high metals and CCR content of the residual fractions generally preclude their effective use as charge stocks for subsequent catalyst processing such as catalytic cracking and hydrocracking. The metal contaminants deposit on the special catalysts for these cracking processes and cause the premature aging of the catalyst and/or formation of inordinate amounts of coke, dry gas and hydrogen. CCR, a measure of a molecule's tendency to coke rather than crack and/or distill, is also an undesirable property for charge streams processed by catalytic cracking. Under the high temperature employed in catalytic cracking, molecules high in CCR thermally and/or catalytically degrade to coke, light gases, and hydrogen.

It is current practice to upgrade certain residual fractions by a pyrolytic operation known as coking. In this operation the residuum is destructively distilled to produce distillates of low metals content and leaves behind a solid coke fraction that contains most of the metals. Coking is typically carried out in a reactor or drum operated at about 800° to 1100° F. temperature and a pressure of one to ten atmospheres. The economic value of the coke by-product is determined by its quality, especially its fulfur and metals content. Excessively high levels of these contaminants make the coke useful only as low valued fuel. In contrast, cokes of low metals content, for example up to about 100 ppm (parts-per-million by weight) of nickel and vanadium, and containing less than about 2 weight percent sulfur may be used in high valued metallurgical, electrical and mechanical applications.

Certain residual fractions are currently subjected to visbreaking, which is a heat treatment of milder conditions than used in coking, in order to reduce their viscosity and make them more suitable as fuels. Again, excessive sulfur content sometimes limits the value of the product.

Residual fractions are sometimes used directly as fuels. For this use, a high sulfur content is many cases is unacceptable for environmental reasons.

At present, catalytic cracking is generally done utilizing hydrocarbon charge stocks lighter than residual fractions which generally have an API gravity less than 20. Typical cracking charge stocks are coker and/or crude unit gas oils, vacuum tower overhead, etc., the feedstock having an API gravity from about 15 to about 45. Since these cracking charge stocks are distillates, they do not contain significant proportions of the large molecules in which the metals are concentrated. Such cracking is commonly carried out in a reactor operated at a temperature of about 800° to 1500° F., a pressure of about 1 to 5 atmospheres, and a space velocity of about 1 to 1000 WHSV.

The amount of metals present in a given hydrocarbon stream is often expressed as a charge stock's "metals factor". This factor is equal to the sum of the metals concentrations, in parts per million, of iron and vanadium plus ten times the concentration of nickel and copper in parts per million, and is expressed in equation form as follows:

$$F_m = Fe + V + 10(Ni + Cu)$$

Conventionally, a charge stock having a metals factor of 2.5 or less is considered particularly suitable for catalytic cracking. Nonetheless, streams with a metals factor of 2.5 to 25, or even 2.5 to 50, may be used to blend with or as all of the feedstock to a catalytic cracker, since charge stocks with metals factors greater than 2.5 in some circumstances may be used to advantage, for instance, with the new fluid cracking techniques.

In any case, the residual fractions of typical crudes will require treatment to reduce the metals factor. As an example, a typical Kuwait crude, considered of average metals content, has a metals factor of about 75 to about 100. As almost all of the metals are combined with the residual fraction of a crude stock, it is clear that at least about 80% of the metals and preferably at least 90% needs to be removed to produce fractions (having a metals factor of about 2.5 to 50) suitable for cracking charge stocks.

Metals and sulfur contaminants would present similar problems with regard to hydrocracking operations which are typically carried out on charge stocks even lighter than those charged to a cracking unit. Typical hydrocracking reactor conditions consist of a temperature of 400° to 1000° F. and a pressure of 100 to 3500 psig.

It is evident that there is considerable need for an efficient method to reduce the metals and/or sulfur and/or CCR content of hydrocarbons, and particularly of residual petroleum fractions. While the technology to accomplish this for distillate fractions has been advanced considerably, attempts to apply this technology to residual fractions generally fail due to very rapid deactivation of the catalyst, presumably by metals contaminants and coke deposition.

U.S. Pat No. 3,696,027 suggests sequentially contacting the feedstream with three fixed beds of catalysts having decreasing macroporosity along the normal direction of feed flow. "Macroporosity" denotes catalyst pores greater than about 500 Angstroms (A) in diameter. It is said to be strongly related to the capacity of catalyst particles to retain metals removed from a heavy hydrocarbon stream contaminated with organometallic compounds. The catalyst particles of the first bed of the '027 process have at least 30 vol. % macropores; the catalyst particles of the second bed have between 5 and 40 vol. % macropores; and the catalyst particles of the third bed have less than 5 vol. % macropores. The patent also teaches that the three fixed beds have progressively more active desulfurization catalysts along the normal direction of flow. The third catalyst bed (which contains the most active desulfurization catalyst) contains high surface area particles having an average pore diameter of at least 50 A, preferably at least 80 A, and more preferably at least 100 A, in order to lengthen the desulfurization run.

U.S. Pat. No. 3,730,879 discloses a two-bed catalytic process for the hydrodesulfurization of crude oil or a reduced fraction, in which at least 50% of the total pore volume of the first bed catalyst consists of pores in 100–200 A diameter range and in which less than 45% of the total pore volume of the second bed catalyst consists of pores in the 100–200 A diameter range. According to the '879 process, demetalation activity increases and desulfurization activity decreases along the normal direction of flow. The patent further suggests a two-catalyst-bed system with increasing average pore diameters and decreasing surface areas.

U.S. Pat. No. 3,766,058 also teaches a two-stage process for hydroprocessing a heavy hydrocarbon feedstock in which the second stage catalyst has a larger pore diameter than the first stage catalyst. Similar teachings are found in U.S. Pat. No. 3,830,720 and U.S. Pat. No. 4,048,060.

U.S. Pat. No. 3,876,530 discloses a multi-stage catalytic process for desulfurizing residual oils in which the initial stage catalyst has a relatively low proportion of hydrogenation metals and in which the final stage catalyst has a relatively high proportion of hydrogenation metals.

U.S. Pat. No. 3,931,052 suggests a two-stage process wherein the first stage catalyst has a strong selectivity for sulfur removal and the second stage catalyst has a strong selectivity for metals removal (U.S. Pat. No. 3,931,052 at col. 4, lines 32–43). The active desulfurization catalyst has at least 50% of its pore volume in the 30 to 100 A diameter range. The active demetalation catalyst has pores substantially distributed over a narrow 180 to 300 A diameter range (not less than 65% of the total pore volume is contained in pores having a diameter between 180 to 300 A).

U.S. Pat. No. 3,977,962 discloses a two-stage hydroconversion process using catalysts having certain pore sizes, surface areas and pore volumes. Both stages employ high surface area catalysts (200–600 m$^2$/g). The second stage catalyst generally has a smaller average pore diameter and surface area relative to the first stage catalyst.

U.S. Pat. No. 4,016,067 discloses a process for demetalation and desulfurization of petroleum oils in two stages with sequentially decreasing average pore diameters and increasing surface areas. The first catalyst has at least about 60% of its pore volume in 100–200 A pores, at least about 5% of its pore volume in pores greater than 500 A, and a surface area of up to about 110 m$^2$/g. The second catalyst has at least 50% of its pore volume in 30 to 100 A pores and a surface area of at least 150 m$^2$/g.

U.S. Pat. No. 4,054,508 discloses a three-stage process for demetalation and desulfurization of petroleum oils wherein the first and second stages contain catalysts as described in related U.S. Pat. No. 4,016,067 (supra) and the third stage comprises a second, smaller bed of the first stage catalyst.

An objection of this invention is an improved process for the removal of metal and/or sulfur and/or CCR contaminants from hydrocarbons especially heavy hydrocarbons such as residual petroleum fractions. Another object of this invention is an improved method for desulfurizing and demetalizing hydrocarbon fractions having significant metal and/or sulfur contaminant contents to produce suitable chargestocks for cracking, hydrocracking, or coking units or to produce a suitable fuel oil or fuel oil blend stock.

SUMMARY OF THE INVENTION

It has now been discovered that hydrocarbon oils, preferably residual fractions, are catalytically hydroprocessed very effectively to remove metals, sulfur, and Conradson Carbon Residue by contacting the oil sequentially with three or more catalysts having sequentially decreasing average pore diameters and sequentially increasing surface areas. As the reactant molecules pass through the reactor beds, they are continuously converted to a lower average size. As the molecules are reduced in size, the average pore size required for high accessability also decreases. Use of several catalysts according to the present invention maintains a near optimal combination of surface area and accessability. The net effect is an enhanced utilization of the second half of the catalyst beds for heteroatom (and CCR) removal from the previously large molecules.

This novel, multi-catalyst-bed process may be used to demetalize and/or desulfurize any hydrocarbon oil that has metals and/or sulfur and/or CCR content undesirably high for a particular application. The process is particularly effective for preparing low metals and/or low sulfur and/or low CCR content feedstocks for catalytic cracking or for coking. In the processing to remove metals, sulfur and CCR; the hydrocarbon oil also is concomitantly enriched in hydrogen, making it an even more suitable chargestock for either of these processes.

DETAILED DESCRIPTION OF THE INVENTION

The hydrocarbon feed to the process of this invention can be a whole crude. However, since the high metal and sulfur components of a crude oil tend to be concentrated in the higher boiling fractions, the present process more commonly will be applied to a bottoms fraction of a petroleum oil, i.e., one which is obtained by atmospheric distillation of a crude petroleum oil to remove lower boiling materials such as naphtha and furnace oil, or by vacuum distillation of an atmospheric residue to remove gas oil. Typical residues to which the present invention is applicable will normally be substantially composed of residual hydrocarbons boiling about 650° F. and containing a substantial quantity of asphaltic materials. Thus, the charge stock can be one having an initial or 5 percent boiling point somewhat below 650° F., provided that a substantial proportion, for example, about 70 or 80 percent by volume, of its hydrocarbon components boils above 650° F. A hydrocarbon stock having a 50 percent boiling point of about 900° F. and which contains asphaltic materials, 4% by weight sulfur and 51 ppm nickel and vanadium is illustrative of such charge stock. Typical process conditions may be defined as contacting a metal and/or sulfur and/or CCR contaminant containing charge stock with this invention's catalyst under a hydrogen pressure of about 500 to 3000 psig at 600° to 850° F. temperature, and 0.1 to 5 LHSV (i.e., 0.1 to 5 volumes of charge stock per volume of catalyst per hour).

The hydrogen gas which is used during the hydrodemetalation, hydrodesulfurization, and CCR removal is circulated at a rate between about 1,000 and 15,000 s.c.f./bbl. of feed and preferably between about 3,000 and 8,000 s.c.f./bb. The hydrogen purity may vary from about 60 to 100 percent. If the hydrogen is recycled, which is customary, it is desirable to provide for bleeding off a portion of the recycle gas and to add makeup hydrogen in order to maintain the hydrogen purity within the range specified. The recycled gas is usually washed with a chemical absorbent for hydrogen sulfide or otherwise treated in known manner to reduce the hydrogen sulfide content thereof prior to recycling.

For the purpose of this invention, it is preferred to use catalyst particles such as 1/32 inch extrudate or the equivalent disposed in three fixed beds. Preferably, the first bed contains a catalyst having at least about 60% of its pore volume in pores with diameters within the range from about 100 to 200 A, up to 5 percent of its pore volume in pores greater than 500 A, and a surface area up to about 120 m$^2$/g. The preferred second catalyst has a surface area within the range from about 120 to 180 m$^2$/g and at least 40 percent of its pore volume in pores with diameters within the range from about 50 to 100 A. The preferred third catalyst has a surface area of at least 200 m$^2$/g and at least 60 percent of its pore volume in pores with diameters within the range from about 30 to 80 A.

Even more desirably, the catalyst contained in the first bed should have a surface area of about 90 to 120 m$^2$/g, a total pore volume of 0.4 to 0.65 cc/g, about 40 to 75 percent of its pore volume in pores with diameters within the range from about 150 to 200 A, and about 1 to 5 percent of its pore volume in pores greater than 500 A diameter.

Treatment of charge stocks such as petroleum resids requires high-metals-capacity catalysts, said capacity achievable, according to the prior art, by macroporosity (i.e., 500 A+ pores). However, excessive macroporosity results in rapid catalyst deactivation because of low surface areas and the consequent reduced tolerance for coke laydown. In the present invention, the purpose of the catalyst selection and configuration is to maximize the overall rates of reaction (e.g., demetalation, desulfurization and CCR removal) by a proper combination of catalyst surface area and effectiveness factors.

Generally, all of the catalysts comprise a hydrogenation component composited with an alumina support. The hydrogenating component of the class of catalysts disclosed herein can be any material or combination thereof that is effective to hydrogenate and desulfurize the charge stock under the reaction conditions utilized. For example, the hydrogenating component can be at least one member of the group consisting of Group VI and Group VIII metals in a form capable of promoting hydrogenation reaction, especially effective catalysts for the purposes of this invention are those comprising molybdenum and at least one member of the iron group metals. Preferred catalysts of this class are those containing about 2 to about 10 percent by weight cobalt and about 5 to about 20 percent by weight molybdenum, but other combinations of iron group metals and molybdenum such as iron, nickel and molybdenum, as well as combinations of nickel and molybdenum, cobalt and molybdenum, nickel and tungsten or other Group VI or Group VIII metals of the Periodic Table taken singly or in combination. The hydrogenating components of the catalysts of this invention can be employed in sulfided or unsulfided form.

When the use of a catalyst in sulfided form is desired, the catalyst can be presulfided, after calcination, or calcination and reduction, prior to contact with the charge stock, by contact with a sulfiding mixture of hydrogen and hydrogen sulfide, at a temperature in the range of about 400° to 800° F., at atmospheric or elevated pressures. Presulfiding can be conveniently effected at the beginning of an onstream period at the same conditions to be employed at the start of such period. The exact proportions of hydrogen and hydrogen sulfide are not critical, and mixtures containing low or high proportions of hydrogen sulfide can be used. Relatively low proportions are preferred for economic reasons. When the unused hydrogen and hydrogen sulfide utilized in the presulfiding operation are recycled through the catalyst bed, any water formed during presulfiding is preferably removed prior to recycling through the catalyst bed. It will be understood that elemental sulfur or sulfur compounds, e.g., mercaptans, or carbon disulfide that are capable of yielding hydrogen sulfide at the sulfiding conditions, can be used in lieu of hydrogen sulfide.

Although presulfiding of the catalysts is preferred, it is emphasized that this is not essential as the catalyst will normally become sulfided in a very short time by contact, at the process conditions disclosed herein, with the high sulfur content feedstocks to be used.

The composition and physical characteristics of catalysts advantageously used in the multi-catalyst system are shown in Table I. Shown first are three NiMo/Al$_2$O$_3$ catalysts having decreasing average pore diameters and increasing surface areas. Also shown are three CoMo/Al$_2$O$_3$ catalysts. The major pore sizes are 100–200 A (Catalysts A and D), 50–100 A (Catalysts B and E), and 30–80 A (Catalysts C and F).

TABLE I

| Catalysts | Catalyst Properties | | | | | |
|---|---|---|---|---|---|---|
| | A | B | C | D | E | F |
| Composition | | | | | | |
| CoO, wt % | | | | 3.7 | 2.8 | 3.4 |
| MoO$_3$, wt. % | 10.0 | 19.0 | 14.4 | 9.6 | 15.4 | 13.4 |
| NiO, wt % | 3.5 | 3.2 | 2.6 | | | |
| SiO$_2$, wt % | | | 4.6 | | 0.5 | 4.9 |
| Real Density, g/cc | 3.78 | 3.478 | 3.56 | 3.69 | 3.532 | 3.33 |
| Particle Density, g/cc | 1.26 | 1.383 | 1.33 | 1.27 | 1.278 | 1.15 |
| Pore Volume, cc/g | .530 | .436 | .471 | .516 | .499 | .490 |
| Surface Area, M$^2$/g | 110 | 152 | 252 | 112 | 171 | 286 |
| Average Pore Diam (A) | 192 | 114 | 75 | 184 | 117 | 108 |
| Pore Size Distribution | | | | | | |
| 0–30 A, vol % | 8 | 4 | 12 | 6 | 10 | 7 |
| 30–50 A, vol % | 2 | 5 | 15 | 2 | 4 | 28 |
| 50–80 A, vol % | 2 | 26 | 66 | 2 | 23 | 61 |
| 80–100 A, vol % | 2 | 26 | 4 | 6 | 30 | 1 |
| 100–200 A, vol % | 59 | 31 | 2 | 77 | 27 | 1 |
| 200–300 A, vol % | 20 | 2 | 0 | 1 | 1 | 0 |
| 300 A+, vol % | 7 | 6 | 1 | 6 | 5 | 2 |
| 500 A+, vol % | | | | 4 | | |

Material balances for a three stage catalyst system comprising Catalysts A/B/C and a two stage catalyst system comprising Catalyst D/F are shown in Table II. Both catalyst systems were evaluated at similar conditions, consisting of three temperatures. The catalysts' performances at 0.25 liquid hourly space velocity are shown at the bottom of Table II. The three stage, NiMo system was superior to the two stage, CoMo system for removal of metals, sulfur, nitrogen, CCR, and asphaltenes. Some improvement in activity, particularly denitrogenation and hydrogenation, may be attributed to the use of NiMo in place of CoMo. However, the significantly improved demetalation activity can only be due to the three stage system. This can readily be seen by comparing the individual demetalation catalysts. In Table III, the large pore (100–200 Å) NiMo and CoMo catalysts are compared. The large pore CoMo catalyst (Catalyst D) shows a slight demetalation advantage over the large pore NiMo catalyst (Catalyst A). In Table IV, the smaller pore (50–100 Å) NiMO and CoMo catalysts are compared in a similar manner. Based solely on the use of NiMo over CoMo, the improved demetalation activity of the three stage system, as shown in Table II, would not be expected.

TABLE IV

Fresh Activity Comparison of (NiMo) Catalyst B and (CoMo) Catalyst E (Arab Lt Atmospheric Resid)

| Catalyst | (charge) | B | B | E | E |
|---|---|---|---|---|---|
| Balance Conditions | | | | | |
| T, °F. | | 676 | 727 | 674 | 725 |
| P, PSIG | | 2000 | 2000 | 2000 | 2000 |
| LHSV | | 0.498 | 0.498 | 0.497 | 0.496 |
| Days on Stream | | 3.6 | 4.6 | 3.5 | 4.5 |
| H$_2$ Circulation, SCF/B | | | | | |
| TLP Properties | | | | | |
| °API | 19.9 | 24.9 | 27.2 | 24.2 | 26.5 |
| H, wt % | 12.12 | 12.44 | 12.80 | 12.60 | 12.64 |
| S, wt % | 2.89 | 0.62 | 0.32 | 0.68 | 0.37 |
| N, wt % | 0.18 | 0.15 | 0.15 | | 0.14 |
| Basic N, ppm | | 350 | 140 | | |
| CCR, wt % | 5.93 | 3.52 | 2.10 | 3.59 | 2.37 |
| V, ppm | 32.2 | 6.4 | 3.3 | 6.7 | 1.4 |
| Ni, ppm | 6.8 | 2.7 | 1.1 | 2.6 | 0.8 |

TABLE II

Fresh Activity Comparison of 3-Stage NiMo and 2-Stage CoMo (Arab Lt Vacuum Resid)

| Catalyst System | (charge) | A/B/C 1 | A/B/C 2 | A/B/C 3 | D/F 1 | D/F 2 | D/F 3 |
|---|---|---|---|---|---|---|---|
| Balance Conditions | | | | | | | |
| T, °F. | | 677 | 728 | 775 | 673 | 725 | 775 |
| P, PSIG | | 2000 | 2000 | 2000 | 2000 | 2000 | 2000 |
| LHSV | | .277 | .278 | .276 | .354 | .233 | .220 |
| Days on Stream | | 1.6 | 2.8 | 4.0 | 1.4 | 2.9 | 4.4 |
| H$_2$ Circulation, SCF/B | | 5368 | 5997 | 11854 | 4580 | 4553 | 5055 |
| TLP Properties | | | | | | | |
| °API | 8.3 | 17.1 | 20.0 | 24.6 | 14.9 | 18.3 | 25.7 |
| H, wt % | 10.67 | 11.77 | 12.10 | 12.34 | 11.67 | 12.10 | 12.56 |
| S, wt % | 3.93 | 0.88 | 0.38 | 0.129 | 1.76 | 0.53 | 0.113 |
| N, wt % | .28 | 0.19 | 0.10 | 0.06 | 0.27 | 0.16 | 0.08 |
| CCR, wt % | 16.13 | 7.38 | 5.56 | 2.97 | 9.02 | 5.75 | 2.37 |
| V, ppm | 68 | 7.5 | 1.1 | 0.2 | 17.0 | 3.8 | 0.1 |
| Ni, ppm | 17 | 4.4 | 1.8 | 0.1 | 6.9 | 2.8 | 0.1 |
| MW | 810 | 651 | 538 | 385 | | | |
| Basic N, ppm | 800 | 500 | 300 | 100 | 800 | 400 | |
| Asphaltenes, wt % | 13.62 | 3.27 | 1.82 | 0.635 | 5.51 | 2.88 | 1.01 |
| Catalyst Performance at LHSV = 0.25: | | | | | | | |
| % demetalation | | 84.6 | 97.4 | 99.8 | 80.1 | 91.6 | 99.7 |
| % desulfurization | | 77.1 | 91.6 | 97.2 | 61.7 | 86.5 | 97.2 |
| % denitrogenation | | 32.5 | 68.3 | 81.3 | 6.7 | 43.7 | 72.4 |
| % CCR removal | | 53.1 | 70.4 | 85.0 | 53.1 | 63.9 | 84.3 |
| % asphaltene removal | | 74.4 | 89.3 | 96.5 | 69.5 | 78.1 | 91.6 |

TABLE III

Fresh Activity Comparison of (NiMo) Catalyst A and (CoMo) Catalyst D (Arab Lt Atmospheric Resid)

| Catalyst | (charge) | A | A | (charge) | D | D |
|---|---|---|---|---|---|---|
| Balance Conditions | | | | | | |
| T, °F. | | 672 | 724 | | 674 | 723 |
| P, PSIG | | 2000 | 2000 | | 2000 | 2000 |
| LHSV | | .534 | .535 | | .492 | .493 |
| Days on Stream | | 4.5 | 5.5 | | 3.5 | 4.5 |
| H$_2$ Circulation, SCF/B | | | | | 6214 | 6310 |
| TLP Properties | | | | | | |
| °API | 20.2 | 23.7 | 26.1 | 19.2 | 23.4 | 25.3 |
| H, wt % | 11.86 | 12.18 | 12.73 | 11.63 | 12.53 | 12.67 |
| S, wt % | 2.90 | 0.96 | 0.60 | 2.79 | 0.85 | 0.47 |
| N, wt % | 0.14 | 0.125 | 0.10 | 0.149 | 0.133 | — |
| CCR, wt % | 6.16 | 4.17 | 2.72 | 6.04 | 4.05 | 3.05 |
| V, ppm | 27.5 | 2.0 | 0.1 | 28.9 | 2.3 | 0.1 |
| Ni, ppm | 5.85 | 2.53 | 0.9 | 4.4 | 1.7 | 0.4 |
| Catalyst Performance at LHSV = 0.50: | | | | | | |
| % demetalation | | 87.6 | 97.4 | | 88.0 | 98.5 |
| % desulfurization | | 68.5 | 80.5 | | 69.9 | 83.4 |
| % denitrogenation | | 13.0 | 31.1 | | 10.6 | — |
| % CCR removal | | 34.8 | 58.4 | | 33.9 | 50.4 |

TABLE IV-continued

Fresh Activity Comparison of (NiMo) Catalyst B
and (CoMo) Catalyst E
(Arab Lt Atmospheric Resid)

| Catalyst | (charge) | B | B | E | E |
|---|---|---|---|---|---|
| MW | | 394 | 378 | 395 | 381 |
| Catalyst Performance at LHSV = 0.50: | | | | | |
| % demetalation | | 77.1 | 89.0 | 76.5 | 94.5 |
| % desulfurization | | 79.0 | 89.2 | 76.9 | 87.5 |
| % denitrogenation | | 18.7 | 19.1 | | 24.4 |
| % CCR removal | | 42.0 | 65.5 | 40.6 | 61.0 |

The inclusion of an intermediate pore sized catalyst stage between large pore and small pore catalysts increases the effectiveness factor for removal of metals by the last stage (i.e., desulfurization) catalysts. Current systems do not achieve both high demetalation and desulfurization at the conditions of this process. Resid hydrotreating processes employing three (or more) catalysts can yield a lower metal product than with current 2-catalyst systems.

What is claimed is:

1. A process for catalytically demetalizing and desulfurizing a residual oil which process comprises passing a mixture of hydrogen and residual oil at a
   pressure of about 500-3000 psig, a temperature of about 600°-800° F. and a space velocity of 0.1-5.0 LHSV through three or more beds of catalyst particles; said catalyst particles comprising the oxides or sulfides of a Group VIB metal and an iron group metal on an alumina support; said catalyst beds containing catalyst particles having a sequentially decreasing average pore diameter and sequentially increasing surface areas, the first catalyst having at least about 60% of its pore volume in pores with diameters within the range from about 100-200 A, up to 5 percent of its pore volume in pores greater than 500 A, and a surface area of up to about 120 $m^2/g$, the second catalyst has a surface area of about 120 to 180 $m^2/g$ and at least 40 percent of its pore volume in pores with diameters of 50-100 A and the last catalyst having a surface area of at least 200 $m^2/g$ and at least 60 percent of its pore volume in pores with diameters of 30-80 A.

2. The process of claim 1 wherein said mixture of hydrogen and residual oil is passed through three beds of catalyst particles.

3. The process of claim 2 wherein the first catalyst has a surface area of about 90 to 120 $m^2/g$, about 40 to 75 percent of its pore volume in pores with diameters within the range from about 150 to 200 A, and about 1 to 5 percent of its pore volume in pores greater than 500 A diameter.

* * * * *